US008346282B1

(12) United States Patent
Dronamraju et al.

(10) Patent No.: US 8,346,282 B1

(45) **Date of Patent: *Jan. 1, 2013**

(54) METHOD AND SYSTEM FOR LOCATING MOBILE STATIONS USING CALL MEASUREMENT DATA

(75) Inventors: Srirama Krishna Dronamraju, Woodridge, IL (US); Abhishek Lall, Manhattan, KS (US); Vishu Srinivasamurthy, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,165

(22) Filed: Apr. 2, 2012

Related U.S. Application Data

(63) Continuation of application No. 12/346,649, filed on Dec. 30, 2008, now Pat. No. 8,165,599.

(51) Int. Cl.
*H04W 24/00* (2009.01)

(52) U.S. Cl. .................................................... 455/456.1

(58) Field of Classification Search .... 455/456.1–456.2, 455/456.5–456.6
See application file for complete search history.

(56) References Cited

U.S. PATENT DOCUMENTS 6,408,186 B1 6/2002 Park et al.
6,459,903 B1 10/2002 Lee
6,865,395 B2 3/2005 Riley
7,039,098 B2 5/2006 Younis
7,177,653 B2 2/2007 McAvoy
8,165,599 B1 4/2012 Dronamraju et al.
2003/0125045 A1 7/2003 Riley et al.
2003/0129992 A1 7/2003 Koorapaty et al.
2004/0198386 A1 10/2004 Dupray
2004/0203880 A1* 10/2004 Riley ........................ 455/456.1
2004/0219930 A1 11/2004 Lin
2005/0064844 A1 3/2005 McAvoy et al.
2006/0194593 A1 8/2006 Drabeck et al.
2006/0234722 A1 10/2006 Hanebeck et al.
2007/0049295 A1 3/2007 Soliman et al.

(Continued)

FOREIGN PATENT DOCUMENTS

WO 2007133045 A1 11/2007

OTHER PUBLICATIONS

S.S. Wang et al., "Adaptive Soft Handoff Method Using Mobile Location Information", IEEE 55th Vehicular Technology Conference, Spring 2002, vol. 4, pp. 1936-1940.

(Continued)

*Primary Examiner* — Meless N Zewdu
*Assistant Examiner* — Tangela T. Chambers

(57) ABSTRACT

A location of a mobile station is estimated based on wireless communications between the mobile station and a wireless telecommunications network. Call measurement data is obtained for a call involving the mobile station and a plurality of base station antennas. The call measurement data includes round-trip delay (RTD) measurements and received signal strength (RSS) measurements. The most significant one or more base station antennas involved in the call are identified. An expected signal strength is calculated for each significant base station antenna, according to a wireless propagation model that accounts for terrain around the base station antennas. For each significant base station antenna, the corresponding expected signal strength, RTD measurement, and RSS measurement are used to calculate an adjusted RTD value. The one or more adjusted RTD values calculated for the one or more significant base station antennas are used to estimate the mobile station's location.

15 Claims, 4 Drawing Sheets

200 A mobile station communicates with a plurality of base station antennas during a call 202 RSS and RTD measurements for each of the base station antennas are stored in a call measurement database 204 A location processor obtains the RSS and RTD measurements from the call measurement database 206 The location processor identifies one or more of the base station antennas as being significant 208 The location processor calculates adjusted RTD values for the significant base station antennas 210 The location processor estimates the location of the mobile station based on the adjusted RTD values

U.S. PATENT DOCUMENTS

2008/0085712 A1 4/2008 Han
2008/0228654 A1* 9/2008 Edge .......................... 455/456.2
2009/0005075 A1* 1/2009 Margrave et al. .......... 455/456.2
2010/0069070 A1 3/2010 Shi et al.
2010/0157820 A1 6/2010 Cheng et al.
2011/0039580 A1 2/2011 Wigren et al.
2011/0065453 A1* 3/2011 Baldemair et al. ......... 455/456.1

OTHER PUBLICATIONS

O. Salient et al., "A Mobile Location Service Demonstrator Based on Power Measurements", IEEE 60th Vehicular Technology Conference, Sep. 26-29, 2004, vol. 6, pp. 4096-4099.

E.D. Murray, "Performance of Network-Based Mobile Location Techniques Within the 3GPP UTRA TDD Standards", Third International Conference on 3G Mobile Communication Technologies, May 8-10, 2002, Conference Publication No. 489, pp. 334-339.

Gopal Dommety et al., "Flat Location Management Scheme for PCNs", IEEE 6th International Conference on Universal Personal Communications, Oct. 12-16, 1997, Conference Record, vol. 1, pp. 146-152.

K.W. Cheung et al., "Least Squares Algorithms for Time-of-Arrival-Based Mobile Location", IEEE Transactions on Signal Processing, vol. 52, No. 4, Apr. 2004, pp. 1121-1128.

Po-Rong Chang et al., "Environment-Adaptation Mobile Radio Propagation Prediction Using Radial Basis Function Neural Networks", IEEE Transactions on Vehicular Technology, vol. 46, No. 1, 1997, pp. 155-160.

Masato Aso et al., "Maximum Likelihood Location Estimation Using Signal Strength and the Mobile Station Velocity in Cellular Systems", IEEE 58th Vehicular Technology Conference, Oct. 6-9, 2003, vol. 2, pp. 742-746.

Michael J. Flanagan et al., "Wireless Network Analysis Using Per Call Measurement Data", Bell Labs Technical Journal, vol. 11, No. 4, 2007, pp. 307-313.

"Arieso launces geo-location monitoring", Arieso Press Release, Jun. 16, 2008.

Mentum S.A., "Mentum Planet: Market leading, state-of-the-art planning and optimization software solutions for wireless access network," 2008.

* cited by examiner

METHOD AND SYSTEM FOR LOCATING MOBILE STATIONS USING CALL MEASUREMENT DATA

CROSS-REFERENCE TO RELATED APPLICATIONS

This application is a continuation of U.S. patent application Ser. No. 12/346,649, filed Dec. 30, 2008, which application is incorporated herein by reference.

BACKGROUND

Increasing demands are being placed on cellular wireless networks to provide information regarding the locations of mobile stations. Accurate location information can be important when a mobile station is making an emergency services call, such as a 9-1-1 call. However, mobile stations are also being used to provide location-based applications to subscribers, such as providing driving directions or identifying nearby business. The Global Positioning System (GPS) is often used to determine the location of a mobile station in response to the user making an emergency services call or invoking a location-based application.

However, location information can also be used for network planning purposes. For example, it may be useful for wireless network operators to understand the geographic distribution of mobile stations at different times of the day. Given the large number of mobile stations involved, it may not be feasible to rely on GPS location fixes. Accordingly, there continues to be a need to find ways of estimating the locations of mobile stations.

OVERVIEW

In accordance with a first principal aspect, an exemplary embodiment provides a method for locating a mobile station based on wireless communications between the mobile station and a wireless telecommunications network. For each antenna in a plurality of base station antennas in the wireless telecommunications network, a measurement of round-trip delay (RTD) in wireless communications between the mobile station and the antenna is obtained and a received signal strength (RSS) measurement of a wireless signal transmitted by the antenna and received by the mobile station is obtained, so as to obtain a plurality of RTD measurements and a plurality of RSS measurements. At least one significant base station antenna is identified from among the plurality of base station antennas. At least one expected signal strength is obtained for the at least one significant base station. At least one adjusted RTD value is determined for the at least one significant base station based, at least in part, on the at least one expected signal strength, at least one RTD measurement corresponding to the at least one significant base station antenna, and at least one RSS measurement corresponding to the at least one significant base station antenna. The at least one adjusted RTD value is used to estimate a location of the mobile station.

In accordance with a second principal aspect, an exemplary embodiment provides a system for estimating locations of a plurality of mobile stations based on wireless communications between the mobile stations and a plurality of base station antennas in a wireless telecommunications network. The system comprises a first data source, a second data source, and a location processor communicatively coupled to the first and second data sources. The first data source is configured to provide call measurement data for a plurality of calls involving the mobile stations, the call measurement data including round-trip delay (RTD) measurements and received signal strength (RSS) measurements. The second data source is configured to provide expected signal strengths according to a wireless propagation model, wherein the wireless propagation model accounts for terrain around the base station antennas. The location processor is configured to estimate locations of the mobile stations based, at least in part, on the RTD measurements, the RSS measurements, and the expected signal strengths.

DETAILED DESCRIPTION OF EXEMPLARY EMBODIMENTS

1. Overview

Figure 1:
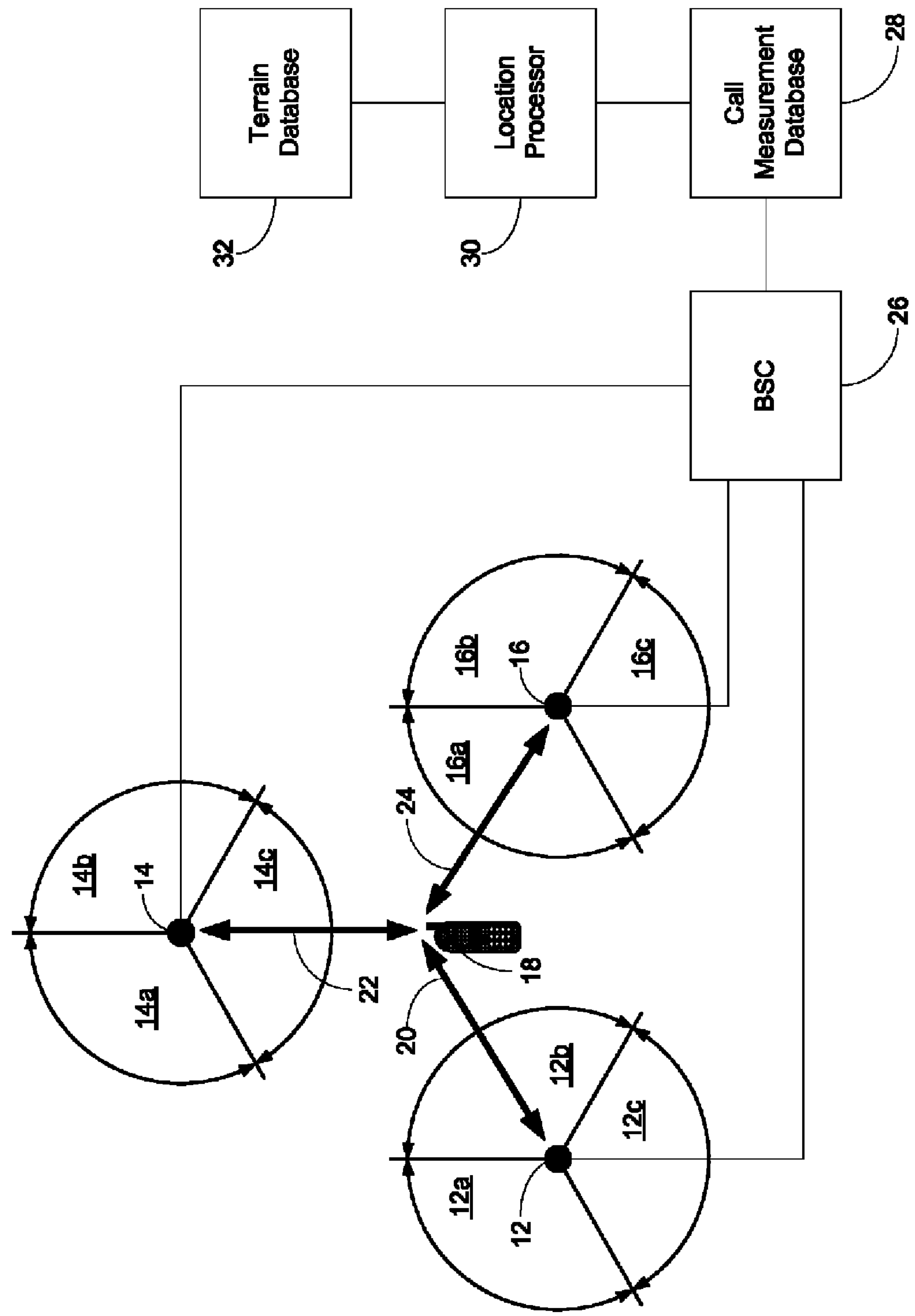
FIG. 1 is a block diagram of a wireless telecommunications network, in accordance with an exemplary embodiment.

A location of a mobile station may be estimated based on wireless communications between the mobile station and a wireless telecommunications network. The wireless communications may relate to a call in which the mobile station transmits and/or receives voice, data, video, or other media. Call measurement data may be generated for the call. The call measurement data may include measurements of round-trip delay (RTD) in wireless communications between the mobile station and one or more base station antennas. The RTD measurements could be made by base stations or by the mobile station. The call measurement data may also include received signal strength (RSS) measurements of wireless signals transmitted by one or more base station antennas and received by the mobile station. For example, the mobile station may measure received signal strengths of pilot signals transmitted by one or more base station antennas and report the RSS measurements to the network in pilot signal measurement messages (PSMMs).

The call measurement data may be stored in a call measurement database that is accessible to a location processor. The location processor may obtain call measurement data from the call measurement database and estimate locations of mobile stations at various times. For example, the location processor may estimate locations of mobile stations at periodic time intervals (such as every hour), in response to requests from network management or network planning tools, in response to requests from location-based applications, or at other times.

To estimate the location of a mobile station from call measurement data involving multiple base station antennas, the location processor may first identify one or more significant base station antennas involved in the call. For example, the location processor may calculate a significance value for each base station antenna and compare it to a predetermined threshold value. If the significance value for a base station antenna exceeds the predetermined threshold value, then the base station antenna may be identified as significant. In an exemplary embodiment, the significance values for the base station antennas are calculated based on parameters such as RTD measurements, RSS measurements, and expected signal strengths, using a significance function. The significance function may be empirically determined, e.g., based on drive test data generated for the base station antennas.

Once the one or more significant base station antennas are identified, the location processor may obtain expected signal strengths for these antennas. In an exemplary embodiment, a wireless propagation model that accounts for terrain around the base station antennas may be used to calculate the expected signal strengths. For example, the wireless propagation model may be used to calculate the signal strength of a pilot signal transmitted by a base station antenna at various locations around the antenna. The location used for the calculation could be based, for example, on an RTD measurement obtained for that base station antenna. Thus, the RTD measurement may be used to calculate an apparent distance from the base station antenna, and the wireless propagation model may be used to calculate an expected signal strength at this apparent distance.

The location processor may determine an adjusted RTD value for each significant base station antenna, for example, using a neural network model. The inputs to the neural network model for a significant base station antenna may include antenna parameters regarding that antenna (e.g., the antenna's geographic coordinates, height, beam width, and azimuth), an expected signal strength for the antenna (e.g., calculated using a wireless propagation model), an RTD measurement for the antenna (e.g., from the call measurement data), and an RSS measurement for the antenna (e.g., from the call measurement data). The neural network model may be trained based on drive test data in which a mobile station generates call measurement data at known locations, for example, as determined using GPS. The adjusted RTD value calculated in this way may more accurately represent the true distance between the mobile station and the base station antenna, in that the measured RTD value may result from indirect propagation paths, such as reflections.

The location processor may use the adjusted RTD values for the significant base station antennas to estimate the location of the mobile station. For example, an adjusted RTD value for a base station antenna may be used to calculate a distance between the mobile station and that base station antenna. If three or more base station antennas have been identified as significant, then standard triangulation techniques may be used to estimate the mobile station's location based on the distances from the adjusted RTD values and the geographic locations of the base station antennas. If only one or two base station antennas have been identified, then additional assumptions may be used to estimate the mobile station's location.

In this way, locations may be estimated for mobile stations using existing call measurement data.

2. Exemplary Network Architecture

FIG. 1 illustrates a wireless telecommunications network 10 in which exemplary embodiments may be employed. Network 10 includes a plurality of base stations, exemplified in FIG. 1 as base stations 12, 14, and 16. Although FIG. 1 shows three base stations, it is to be understood that network 10 may include a greater or fewer number. Each base station may include directional antennas that define a plurality of sectors. As shown in FIG. 1, base station 12 has sectors 12*a*, 12*b*, and 12*c*, base station 14 has sectors 14*a*, 14*b*, and 14*c*, and base station 16 has sectors 16*a*, 16*b*, and 16*c*. Although FIG. 1 shows each base station with three sectors, it is to be understood that a base station may include a greater or fewer number of sectors.

A mobile station may communicate with one or more sectors. For purposes of illustration, FIG. 1 shows a mobile station 18 communicating with sector 12*b* (via a communication link 20), with sector 14*c* (via a communication link 22), and with sector 16*a* (via a communication link 24). Mobile station 18 could be a wireless telephone, wirelessly personal digital assistant, wirelessly-equipped laptop computer, or other wireless communication device. The communications over communication links 20, 22, and 24 could be in accordance with 1xRTT CDMA, EV-DO, IEEE 802.16 (WiMAX), or other wireless specification. Each of communication links 20, 22, and 24 may include a forward link, used to transmit communications from a base station to the mobile station, and a reverse link, used to transmit communications from the mobile station to a base station. The forward link may include a number of different channels, such as a pilot channel, synch channel, and forward traffic channels. The reverse link may include access channels and reverse traffic channels.

Base stations 12, 14, and 16 may be controlled by a base station controller (BSC) 26. BSC 26 may, in turn, be communicatively coupled to the public-switched telephone network (PSTN), e.g., via a mobile switching center (MSC), and/or to a packet-switched network, e.g., via a packet data serving node (PDSN). In this way, network 10 may enable mobile station 18 to originate and receive circuit-switched calls and/or packet-switched calls. During such calls, mobile station 18 may transmit and/or voice, video, data, and/or other media.

When mobile station 18 is engaged in a call, mobile station 18 may send and receive the voice or other media in the call via one or more sectors. Thus, in the example shown in FIG. 1, sectors 12*b*, 14*c*, and 16*a* may be involved in the call, with mobile station 18 sending and receiving the voice or other media in the call via communication links 20, 22, and 24. Mobile station 18 may also measure the received signal strengths of pilot signals transmitted by the sectors involved in the call, e.g., sectors 12*b*, 14*c*, and 16*a*, and may report the RSS measurements to BSC 26 in pilot strength measurement messages (PSMMs). During the call, sectors 12*b*, 14*c*, and 16*a* may also measure round-trip delays in the communications exchanged with mobile station 18 and report these round-trip delay (RTD) measurements to BSC 26.

Although FIG. 1 shows mobile station 18 in communication with sectors 12*b*, 14*c*, and 16*a*, it is to be understood that mobile station 18 could communicate with a greater or fewer number of sectors during a call. In addition, the sectors involved in the call may change as mobile station 18 moves during the call. For example, with reference to FIG. 1, mobile station 18 may move to a different location during the call, such that mobile station 18 communicates with sector 16*c* instead of 16*a*. Thus, RSS measurements and RTD measurements may be generated for different sectors at different times during a call.

BSC 26 may store the RSS measurements and RTD measurements reported to it in a call measurement database 28. In this way, call measurement database 28 may retain call measurement data relating to multiple calls and multiple mobile stations. It is to be understood that call measurement data may include information in addition to RSS measurements and RTD measurements.

A location processor 30 may be communicatively coupled to call measurement database 28. Location processor 30 may estimate locations of mobile station (e.g., at periodic time intervals) based, at least in part, on information contained in call measurement database 28, for example, RTD measurements and RSS measurements. Location processor 30 may also be communicatively coupled to a terrain database 32.

Terrain database 32 may store information regarding the base stations served by BSC. For example, terrain database 32 may store geographic coordinates of base station antennas (e.g., latitude and longitude), the height of the cell towers where the base station antennas are located, and the azimuths and beam widths of the sectors defined by the base station antennas.

In addition, terrain database 32 may be able to calculate expected signal strengths at different locations of pilot signals transmitted by the base station, according to a wireless propagation model. The wireless propagation model may account for the terrain around the base stations. The terrain may include natural features such as hills, mountains, and valleys, and man-made features such as buildings. The terrain may cause effects such as multipath propagation, reflection, diffraction, and shadowing.

Figure 2:
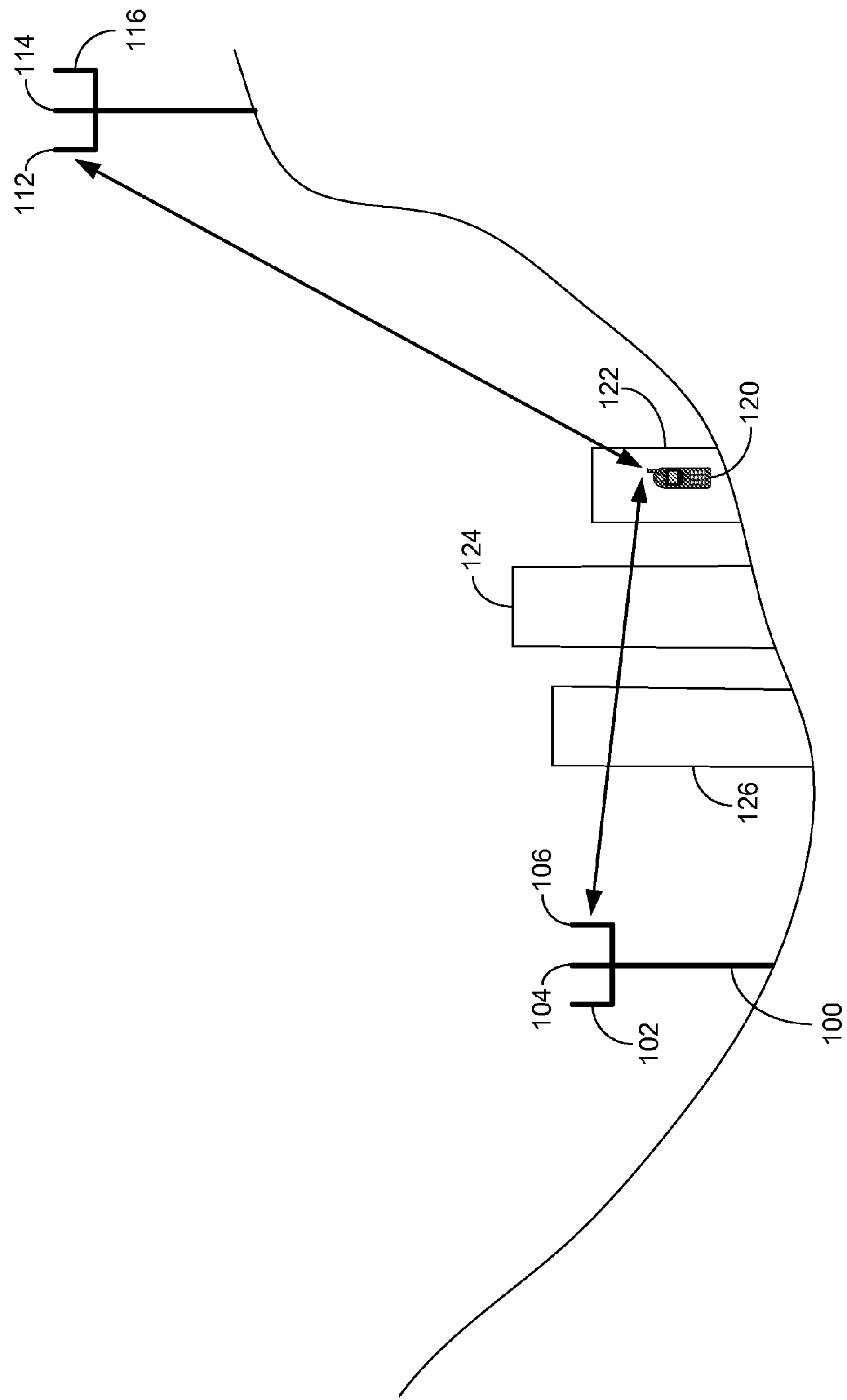
FIG. 2 is a schematic diagram illustrating the effects of terrain on communications between a mobile station and base station antennas, in accordance with an exemplary embodiment.

FIG. 2 illustrates some of the effects of terrain. FIG. 2 shows a cell tower 100 with base station antennas 102, 104, and 106 (for corresponding sectors) and a cell tower 110 with base station antennas 112, 114, and 116. A mobile station 120 located inside of a building 122 is in communication with antenna 106 and antenna 112. Mobile station 120 is able to wireless signals from antenna 112 in a line-of-sight path. However, buildings 124 and 126 obstruct the line-of-sight path between antenna 106 and mobile station 120. Thus, the wireless signals from antenna 106 received by mobile station 120 may be reflected or diffracted. As a result, the RTD value measured for the wireless communications between mobile station 120 and antenna 106 may not accurately represent the distance between them. In addition, the elevation of the land around buildings 122, 124, and 126 may also affect propagation.

Wireless propagation models such as the CRC Model, Free Space Model, Okumura-Hata Model, or Longley-Rice Model may be used to account for terrain. The Mentum Planet tool from Mentum S.A., Velizny, France is an example of a commercially available product that has this capability.

Thus, location processor 30 may obtain data, such as RTD measurements and RSS measurements, from call measurement database 28 and data, such as the geographic coordinates of base station antennas and expected signal strengths, from terrain database 32. Location processor 30 may use the data obtained from call measurement database 28 and terrain 30 to estimate locations of mobile stations. Described below are exemplary methods that the location processor 30 may use for estimating the location of a mobile station.

3. Exemplary Location Estimation Method

Figure 3:
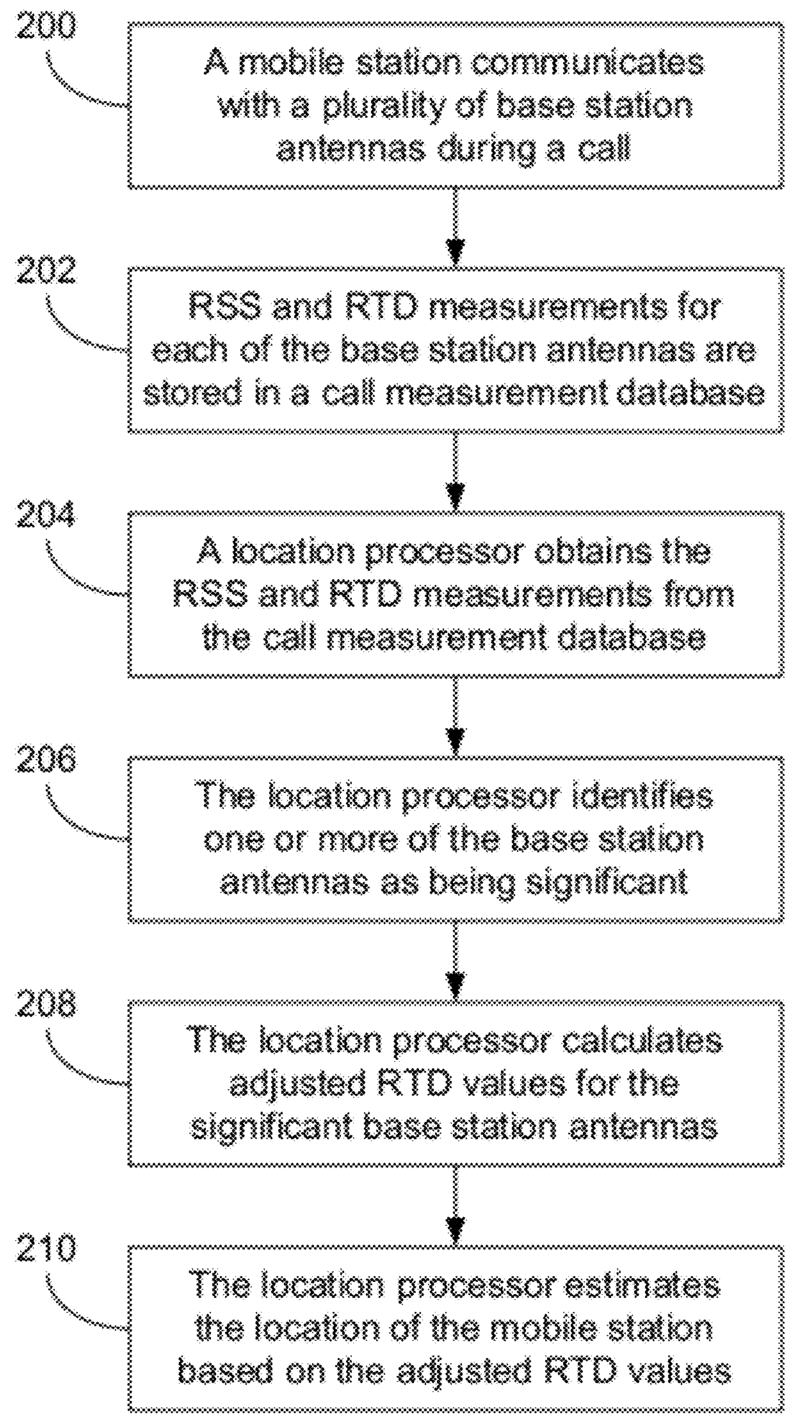
FIG. 3 is a flow chart illustrating a method of operation, in accordance with an exemplary embodiment.

FIG. 3 illustrates an exemplary method that may be used to estimate the location of a mobile station. For purposes of illustration, the method is explained with reference to wireless telecommunications network 10 shown in FIG. 1. It is to be understood, however, that other network architectures could be used.

The process may begin when a mobile station is engaged in a call and communicates with a plurality of base station antennas during the call, as indicated by block 200. For example, as shown in FIG. 1, mobile station 18 may be in communication with base station antennas defining sectors 12*b*, 14*c*, and 16*a*. Although in FIG. 1, mobile station 18 is in communication with three base station antennas, it is to be understood that a mobile station may communicate with either a greater or fewer number of base station antennas during a call.

During the call, the mobile station takes received signal strength (RSS) measurements of the pilot signals transmitted by the base station antennas and reports the RSS measurements to the network in pilot strength measurement messages. In an exemplary embodiment, the mobile station reports each RSS measurement as an $E_C/I_0$ value (i.e., as a ratio of the energy per chip to the received interference). However, RSS measurements could be reported in terms of other parameters.

The network also takes round-trip delay (RTD) measurements of the wireless communications between the mobile station and each of the base station antennas. These RSS measurements and RTD measurements for the base station antennas are part of the call measurement data that is generated for the call and stored in a call measurement database (e.g., call measurement database 28), as indicated by block 202.

At some point, a location processor (e.g., location processor 30) obtains the RSS and RTD measurements from the call measurement database in order to estimate the mobile station's location, as indicated by block 204. The location processor may do this sometime after the call has been completed. For example, location processor may be configured to estimate locations of mobile stations at periodic time intervals, such as every hour. Alternatively, the location processor may estimate the location of a mobile station in response to a specified event, such as a request from a location-based application or a network management tool.

The location processor may use the RSS and RTD measurements to identify one or more of the base station antennas as being significant, as indicated by block 206. To determine which base station antennas are significant, the location processor may calculate a significance value for each base station antenna. Equation (1) sets forth an exemplary formula for calculating a significance value of between 0 (the lowest level of significance) and 1 (the highest level of significance) for each base station antenna:

$$S_i=1/[1+\exp(\psi_0+\psi_1 R_i+\psi_2 E_i+\psi_3 T_i)] \tag{1}$$

In equation (1), $S_i$ is the significance value for the $i^{th}$ base station antenna, $R_i$ is the RTD measurement for the $i^{th}$ base station antenna, $E_i$ is the RSS measurement for the $i^{th}$ base station antenna, and $T_i$ is a reference signal strength for the $i^{th}$ base station antenna.

The reference signal strength may be based on a wireless propagation model. For example, a wireless propagation model may be used to calculate what the signal strength of a base station antenna's pilot signal would be at a reference location, taking into account the effects of terrain. The reference location could be either a fixed location or a location that is based on the RTD measurement reported for the base station antenna. The location processor may obtain reference signal strengths from a terrain database (e.g., terrain database 32).

The $\psi$ values are constants that may be empirically determined, for example, from drive test data. In the drive test approach, a mobile station is moved to various locations that are known (e.g., using GPS), and the mobile station engages in a call at each location. In this way, call measurement data may be generated for representative locations served by the base station antennas. The call measurement data for each location is then analyzed to identify the strongest base station antenna in each call, based on the RSS measurements reported by the mobile station. The strongest base station antennas are deemed to have the highest possible significance value (S=1). The $R_i$, $E_i$, and $T_i$ values obtained for each of the strongest base station antennas are then used in Equation (1), with $S_i=1$, and the $\psi$ values that best fit the data are calculated.

It is to be understood that Equation (1) is exemplary only, as other approaches could be used to calculate significance values or otherwise identify significant base station antennas.

In addition, although Equation (1) uses RTD measurements, RSS measurements, and reference signal strengths, it is to be understood that the identification of significant base station antennas could be based on other factors.

The location processor uses Equation (1) to calculate a significance value for each base station antenna involved in the call and then compares the significance value to a predetermined threshold value. With significance values varying between 0 and 1, the predetermined threshold value could be 0.5 or other fixed value that is found to yield satisfactory results. If the significance value exceeds the predetermined threshold value, then the base station antenna is identified as being significant.

The location processor then calculates adjusted RTD values for the significant base station antennas, as indicated by block 208. In an ideal case, an RTD value can be related to the distance between the mobile station and the base station antenna, according to Equation (2):

$$d_i = cR_i/2 \quad (2)$$

In Equation (2), $d_i$ is the distance between the mobile station and the $i^{th}$ base station antenna, $R_i$ is the RTD value for the $i^{th}$ base station antenna, and c is the speed of light.

However, measured RTD values are often not ideal because the measurements do not come from line-of-sight propagation paths. Thus, when terrain causes effects such as diffraction and reflection, an RTD measurement may not accurately indicate distance in accordance with Equation (2). The adjusted RTD values calculated in block 208 are intended to be more accurately indicate distance in accordance with Equation (2). Thus, the adjusted RTD values may be calculated so as to compensate for the terrain effects in the measured RTD values.

Figure 4:
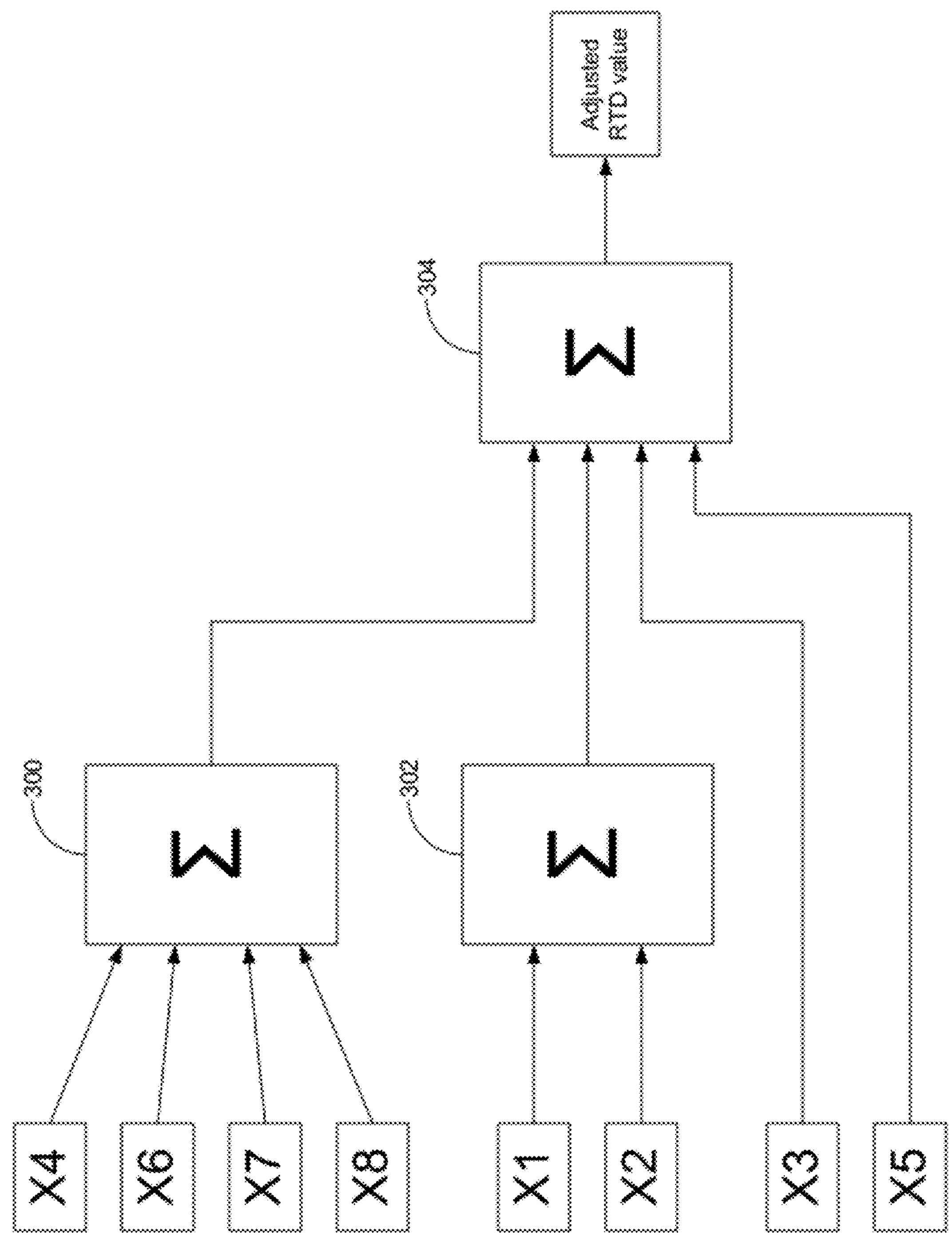
FIG. 4 is a schematic diagram illustrating a neural network model, in accordance with an exemplary embodiment.

In an exemplary embodiment, the location processor uses a neural network model to calculate the adjusted RTD values. FIG. 4 illustrates an exemplary neural network model that may be used to calculate an adjusted RTD value for a significant base station antennas, based on input parameters corresponding to that antenna. Eight input parameters, identified as X1 through X8, are used in the neural network model illustrated in the FIG. 4. These input parameters are described below in Table 1.

TABLE 1

| Input Parameter | Name | Description |
|---|---|---|
| X1 | Azimuth | The orientation (in degrees) of the base station antenna. |
| X2 | Beam Width | The angle (in degrees) between the half-power (−3 dB) points of the main lobe of the base station antenna's radiation pattern. |
| X3 | Measured Signal Strength | The received signal strength of the base station antenna's pilot signal, as measured by the mobile station. This RSS measurement may be expressed as $E_C/I_0$. |
| X4 | Expected Signal Strength | The expected signal strength of the base station antenna's pilot signal at an expected location, according to a wireless propagation model that accounts for terrain. |
| X5 | RTD | The round-trip delay measured for the base station antenna when communicating with the mobile station. |
| X6 | Height | The height of the cell tower where the base station antenna is located. |
| X7 | Latitude | The latitude of the cell tower where the base station antenna is located. |
| X8 | Longitude | The longitude of the cell tower where the base station antenna is located. |

As Table 1 indicates, the neural network model used an RSS measurement (X3) and an RTD measurement (X5) from the call measurement data. In addition, the model uses an expected signal strength (X4) according to a wireless propagation model that accounts for the terrain around the base station antenna. The expected signal strength (X4) may be calculated for an expected location of the mobile station, for example, based on the corresponding RTD measurement (X5) for that base station antenna. The other input parameters (X1, X2, X6, X7, and X8) are antenna parameters that depend on the base station antenna rather than on the mobile station. The location processor may obtain the antenna parameters (X1, X2, X6, X7, and X8) and the expected signal strength (X4) from a terrain database (e.g., terrain database 32).

As shown in FIG. 4, a weighted sum of input parameters X4 through X8 may be calculated at node 300, and a weighted sum of input parameters X1 and X2 may be calculated at node 302. At node 304, the adjusted RTD value is calculated as a weighted sum of input parameters X3 and X5, the output of node 300, and the output of node 302. The weighting values used in nodes 300, 302, and 304 may be determined by training the neural network model using the drive test data described above. In particular, the neural network model may be trained so that locations that are calculated based on the adjusted RTD values from the neural network model best fit the known locations used in the drive test data.

It is to be understood that the neural network models shown in FIG. 4 is exemplary only. Other models could be used, and such other models could use additional and/or different input parameters.

Once the location processor has calculated adjusted RTD values for the significant base station antennas, the location processor then estimates the location of the mobile station based on the adjusted RTD values, as indicated by block 210. How the location processor uses the adjusted RTD values to estimate location may depend on the number of adjusted RTD values that were calculated, which, in turn, is equal to the number of significant base station antennas that were identified.

If there is only one significant base station antenna, then the mobile station may be assumed to be on the center line of the antenna's radiation pattern, with the mobile station's distance from the antenna calculated based on the adjusted RTD value using Equation (2).

If there are two significant base station antennas, then the distances between the mobile station and each of the antennas may be calculated based on the adjusted RTD values using Equation (2). The two distances calculated in this way may be used to define circles around the two significant base station antennas. The mobile station may be located where the two circles intersect. If the two circles intersect at two points, then the relative orientation of the radiation patterns of the two significant base station antennas may be used to select which of the two points of intersection is more likely to represent the mobile station's location.

If there are three significant base station antennas, then standard triangulation techniques may be used to determine the mobile station's location. If there are more than three significant base station antennas, then the mobile station's location may be determined using the three most significant base station antennas. In this way, the locations of mobile stations may be estimated from call measurement data that is already collected for calls involving the mobile stations.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:

for each antenna in a plurality of base station antennas in a wireless telecommunications network, obtaining a respective significance value for said antenna based, at least in part, on delay and signal strength measurements for a wireless signal transmitted by said antenna and received by a mobile station, so as to obtain a plurality of significance values;

identifying at least one significant base station antenna from among said plurality of base station antennas based on said significance values;

obtaining at least one expected signal strength for said at least one significant base station antenna; and determining an estimated location of said mobile station based on an adjusted delay value for said at least one significant base station antenna, wherein said adjusted delay value is based, at least in part, on said at least one expected signal strength for said at least one significant base station antenna.

2. The method of claim 1, wherein said delay and signal strength measurements are obtained from measurement data for a call involving said mobile station.

3. The method of claim 1, wherein identifying at least one significant base station antenna from among said plurality of base station antennas based on said significance values comprises:

for each antenna in said plurality of base station antennas:

determining whether said respective significance value for said antenna exceeds a predetermined threshold value, and in response to determining that said respective significance value for said antenna exceeds said predetermined threshold value, identifying said antenna as a significant base station antenna.

4. The method of claim 1, wherein obtaining said respective significance value for said antenna based, at least in part, on said delay and signal strength measurements for said wireless signal transmitted by said antenna comprises:

obtaining a reference signal strength for said antenna; and calculating said respective significance value for said antenna based on said reference signal strength and said delay and signal strength measurements.

5. The method of claim 4, wherein obtaining said reference signal strength for said antenna comprises:

selecting a reference location for said antenna; and calculating said reference signal strength as a signal strength at said reference location of a signal transmitted by said antenna, according to a wireless propagation model.

6. The method of claim 5, wherein said wireless propagation model accounts for terrain around said antenna.

7. The method of claim 5, wherein said reference location comprises a fixed location.

8. The method of claim 5, wherein said reference location comprises a location selected based on a delay measurement reported for said antenna.

9. The method of claim 1, wherein determining said estimated location of said mobile station based on said adjusted delay value for said at least one significant base station antenna, and wherein determining said estimated location of said mobile station based on said adjusted delay value comprises:

using a neural network model to calculate said adjusted delay value based on antenna parameters comprising: a parameter for expected signal strength for a first significant base station antenna of said plurality of base station antennas, a parameter for a measured signal strength corresponding to said first significant base station antenna, and a parameter for a delay measurement corresponding to said first significant base station antenna.

10. A network, comprising:

a plurality of base station antennas configured to communicate with a plurality of mobile stations; and a location processor, configured to:

select a mobile station of said plurality of mobile stations, obtain delay and signal strength measurements for wireless signals transmitted by said plurality of base station antennas and received by said selected mobile station, for each antenna of said plurality of base station antennas, obtaining a respective significance value for said antenna based, at least in part, on said delay and signal strength measurements, so as to obtain a plurality of significance values, identify at least one significant base station antenna from among said plurality of base station antennas based on said significance values, obtain at least one expected signal strength for said at least one significant base station antenna, and determine an estimated location of said selected mobile station based on an adjusted delay value for said at least one significant base station antenna, wherein said adjusted delay value is based, at least in part, on said at least one expected signal strength for said at least one significant base station antenna.

11. The network of claim 10, wherein said location processor is configured to estimate a location of said selected mobile station at periodic time intervals.

12. The network of claim 10, wherein said delay and signal strength measurements are obtained from measurement data for a call involving said selected mobile station.

13. The network of claim 10, wherein said location processor is configured to identify at least one significant base station antenna from among said plurality of base station antennas based on said significance values by a process comprising:

for each antenna in said plurality of base station antennas:

determining whether said respective significance value for said antenna exceeds a predetermined threshold value, and in response to determining that said respective significance value for said antenna exceeds said predetermined threshold value, identifying said antenna as a significant base station antenna.

14. The network of claim 10, wherein said location processor is configured to obtain said respective significance value for said antenna based, at least in part, said delay and signal strength measurements by a process comprising:

obtaining a reference signal strength for said antenna; and calculating said respective significance value for said antenna based on said reference signal strength and said delay and signal strength measurements.

15. The network of claim 10, wherein said location processor comprises a neural network model, and wherein determining said estimated location of said selected mobile station based on said adjusted delay value comprises:

using said neural network model of said location processor to calculate said adjusted delay value based on antenna parameters comprising: a parameter for expected signal strength for a first significant base station antenna of said plurality of base station antennas, a parameter for a measured signal strength corresponding to said first significant base station antenna, and a parameter for a delay measurement corresponding to said first significant base station antenna.

* * * * *